United States Patent [19]
Cronin et al.

[11] 4,130,850
[45] Dec. 19, 1978

[54] HIGH SPEED FAULT DIVERTER SWITCH FOR GAS-INSULATED SYSTEMS

[75] Inventors: John C. Cronin; Willy Schuetz, both of Greensburg, Pa.

[73] Assignee: Gould Inc., Rolling Meadows, Ill.

[21] Appl. No.: 758,635

[22] Filed: Jan. 12, 1977

[51] Int. Cl.² ............................................. H02H 7/22
[52] U.S. Cl. .................................. 361/54; 200/144 B; 361/57
[58] Field of Search ................. 361/57, 56, 54, 55, 361/37, 35, 136; 174/11 R, 6, 7; 200/144 R, 144 B, 146 A, 146 AA, 146 R, 82 B; 307/118, 144, 33, 39

[56] References Cited
U.S. PATENT DOCUMENTS

| | | | |
|---|---|---|---|
| 2,971,130 | 2/1961 | Diebold | 361/57 |
| 3,855,434 | 12/1974 | Grunert et al. | 200/144 B |
| 3,962,605 | 6/1976 | Thaler | 361/54 |

*Primary Examiner*—Patrick R. Salce
*Attorney, Agent, or Firm*—Ostrolenk, Faber, Gerb & Soffen

[57] ABSTRACT

A high speed fault diverter switch is connected near the input side of a gas-insulated substation. The switch is normally open and is used in response to arcing anywhere within the substation to connect the gas-insulated high-voltage conductor to ground for each phase of the system at high speed to divert the fault current to ground.

7 Claims, 3 Drawing Figures

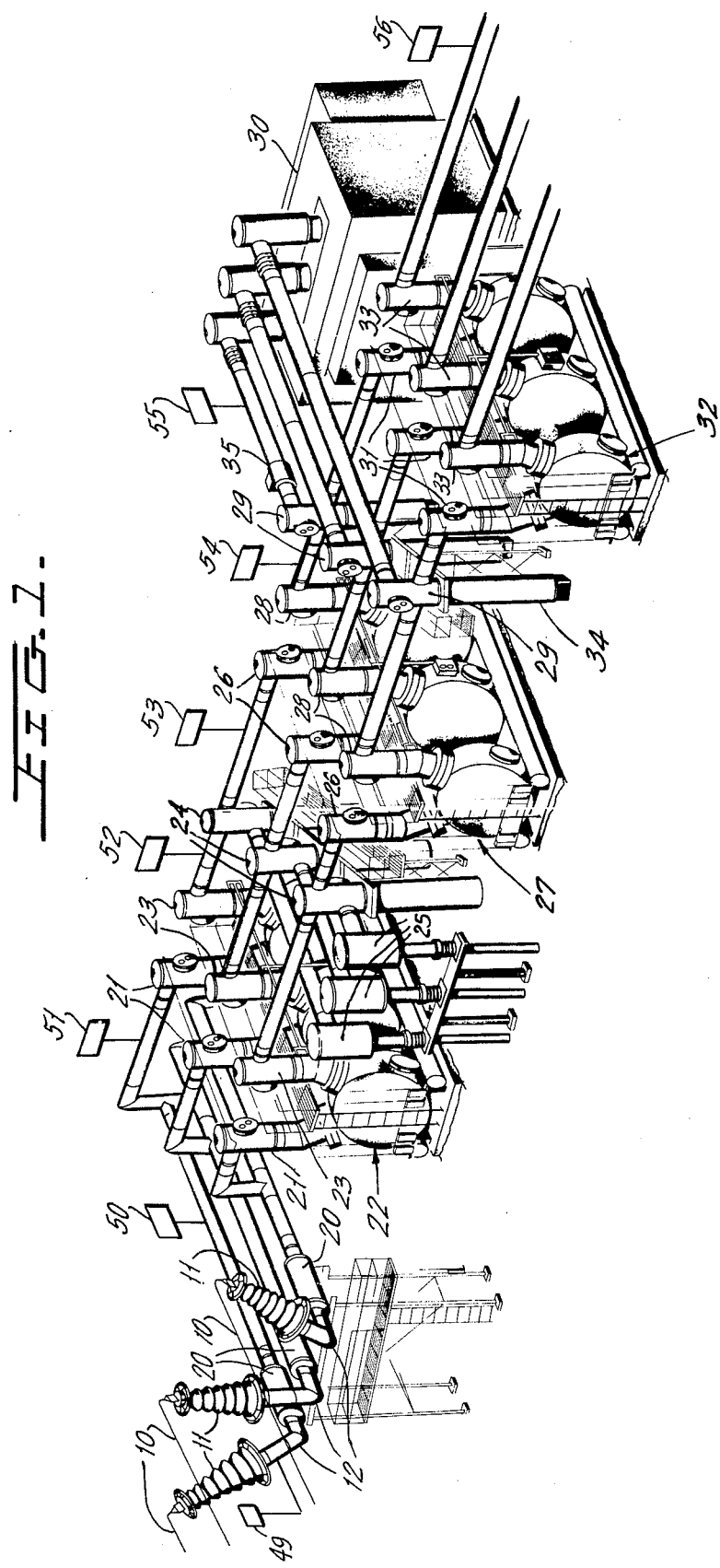

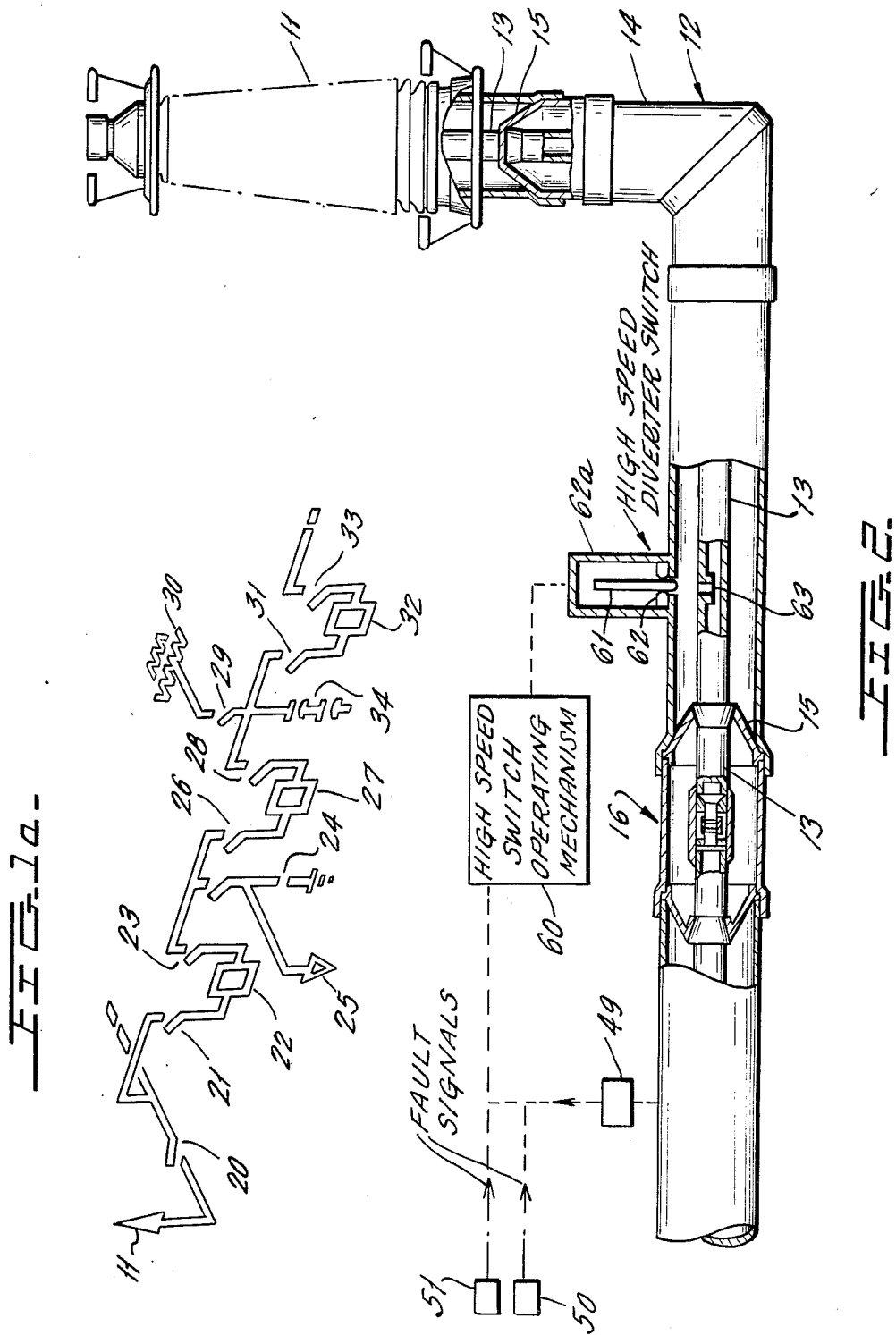

HIGH SPEED FAULT DIVERTER SWITCH FOR GAS-INSULATED SYSTEMS

BACKGROUND OF THE INVENTION

This invention relates to electrical power substations, and more specifically relates to a novel high speed fault diverter switch for such substations which diverts fault current to ground in the event of a failure or arcing somewhere within the substation.

Gas-insulated substations which occupy a small area are well known for the distribution of electrical power at extremely high voltage, for example 345,000 volts. Thus, electrical power substations, which deal with extremely high voltages, have occupied extremely large ground volumes in the past where the equipment used in the substation was air-insulated equipment. Gas-insulated substations utilize the exceptional dielectric properties of electronegative gases, such as sulfur hexafluoride and enclose the substation conductors and apparatus in sulfur hexafluoride, thereby obtaining extreme savings in space since the dielectric gas permits the designer to locate conductors and equipment much closer than when air-insulation is used.

In gas-insulated systems, it is possible that an internal flashover can occur in one of the bus connectors or in one of the components of the substation. Such internal flashover can result in a significant rise in gas pressure within the equipment and in burn-through of the metallic grounded enclosure of the equipment. Both burn-through and gas pressure rise depend upon the magnitude of the fault current and the fault duration.

Pressure rise is affected by the gas volume which, in turn, may relate to the distance between insulators which support the bus conductors within their respective grounded housing and to the support insulator construction — whether or not the insulators are gas barriers or have gas flow openings therethrough. Even if the insulators have openings, they still would tend to restrict the flow of gas between adjacent sections in the event of a rapid pressure increase due to an internal fault, thereby further permitting the rise in internal pressure in the section containing the fault. The rise in pressure within the substation and its components is in any event extremely rapid and can cause the mechanical failure of the system components, and further causes the distribution of contaminated arcing products throughout the system.

Present protection systems all rely on back-up cicruit breakers which require several cycles to operate in order to clear such faults, and further rely on component design to limit the deleterious effects of a fault within the system.

The burn-through problem described above is extremely serious and tests have shown that a conventional aluminum housing can burn through in about six cycles of 50 kA arcing. Clearly, the burn-through time will vary with enclosure material and thickness. In any event, burn-through arcing will tend to cause weakened regions within the grounded enclosure, and the arcing itself may cause extensive damage to the insulation system.

As pointed out previously, internal arcing in a gas-insulated substation has been dealt with simply by relying upon existing back-up circuit breaker protection and by designing the substation components to limit the degree of damage due to arcing and to limit the spread of contamination products.

BRIEF DESCRIPTION OF THE INVENTION

In accordance with the present invention, a novel high speed fault diverter switch is provided adjacent the input to the substation. Sensing devices are provided in various sections of the substation and are connected to the diverter switch, and can close the fault diverter switch responsive to the sensing of arcing in their respective section. The sensing devices can operate by directly sensing current, or by sensing increased pressure within the housing, increased temperaure within the housing, the appearance of light within the housing caused by the arc, and the like. The fault diverter switch is a high speed switching device capable of closing on a fault and then reopening at a later time to clear the short on the system, and operates to short-circuit the high voltage conductor to its grounded housing within a fraction of a cycle in a 60 hertz system.

High speed short circuiters of this type are known in the art and the short circuiters used in the present invention could be typically of the type shown in U.S. Pat. No. 2,971,130, dated Feb. 7, 1961, entitled ELECTRODYNAMIC SWITCHING DEVICE, in the name of Edward J. Diebold. Any other suitable high speed closing switch can be used where the switch is capable of operating within a fraction of a cycle, is capable of closing on the fault current, and is capable of reopening after the fault has been cleared.

By providing a fault diverter switch as described above, it will be clear that the substation conductors will be immediately connected to ground at the input of the substation in response to a fault somewhere within the substation and will short-circuit the fault current. This will then limit any damage to the enclosure and to the gas-insulated system due to continued arcing, and the possibility of enclosure burn-through is minimized and pressure rise within various parts of the substation are substantially limited since the arc is quickly short-circuited.

BRIEF DESCRIPTION OF THE DRAWINGS

FIG. 1 is a perspective schematic diagram of a typical sulfur hexafluoride insulated substation which is to be provided in accordance with the present invention.

FIG. 1a is a line diagram of the substation of FIG. 1.

FIG. 2 is a side elevation view partly in cross-section of one of the input conductors to the substation equipped with a high speed diverter switch in accordance with the present invention.

DETAILED DESCRIPTION OF THE DRAWINGS

Referring first to FIGS. 1 and 1a, there is illustrated therein a typical gas-insulated substation which can be used for the distribution of electrical power at 60 hertz and at about 345 kV. Clearly, other low frequencies could be used and other extra-high voltages can be used.

Three overhead power lines 10 are connected to the substation input and are connected to air entrance bushings 11. The air entrance bushings 11 are then connected to gas-insulated bus sections 12, where insulated bus section 12 for one of the phases of FIG. 1 is shown in more detail in FIG. 2. Thus, as shown in FIG. 2, gas-insulated bus 12 consists of a central conductor 13 which is the high voltage conductor of the system and is surrounded by a metallic grounded outer housing 14. The bus 13 is supported within the grounded housing 14 by conical insulators 15 of well-known type, which are spaced along the length of the bus 13 and housing 14 to provide good support for the conductor 13. Note that the bus 12 and the remaining bus within the substation can be made of sections connected together, as shown by the plug-in connection region 16 of FIG. 2.

The interior of the housing 14, as is true throughout the substation, is then filled with any suitable dielectric gas such as sulfur hexafluoride under pressure, for example at 45 p.s.i.g.

In the substation of FIGS. 1 and 1a, the entrance bushings 11 are connected to the system through horizontal gas-filled disconnect switches 20, and the switches 20 are connected by short gas-insulated bus lengths to vertical disconnect switches 21 and then to the three-phase circuit breaker 22. The three-phase circuit breaker 22 may be of the type shown in U.S. Pat. No. 3,909,571, in the name of Hansruedi Aumayer, dated Sept. 30, 1975.

The insulated bus conductors then proceed through further gas-insulated switches 23 to surge arrestors 24 and potheads 25 and then into switches 26 to three-phase circuit breaker 27. The circuit then proceeds through the circuit breaker 27, through switch 28, into switches 29 and then to a transformer 30. The circuit also proceeds through switches 31 to circuit breaker 32 and then out through switches 33 to other circuit portions. Also provided within the substation will be coupling capacitor voltage transformers 34 and, as shown in FIG. 1, there will also be provided a single fault initiating ground switch 35 which is a relatively low speed device (for example five or 10 cycles), and is operated differently than the diverter switch of the invention.

As described before, an arc can occur anywhere within the system, shown in FIG. 1, from the central conductor of the system to the outer grounded housing of the system bus members or the grounded housing of the system components. If such a fault should occur, the pressure of the dielectric gas in the faulted section will rise quickly to possibly dangerous values which could damage the bus and spread contamination products throughout the system. Moreover, it is possible that the arc can burn through the grounded enclosure and cause other damage to the insulation system such as the insulator 15 of FIG. 2 which is used in the support of the bus throughout the substation of FIG. 1.

In accordance with the present invention, and as shown in FIG. 2, a plurality of fault-sensing devices are located throughout the substation, schematically indicated by the fault sensors 49, 50, 51, 52, 53, 54, 55 and 56 in FIG. 1. These fault sensors may be current monitors, pressure monitors responsive to the internal pressure within the bus section or housing section in which they are connected and are adapted to produce an immediate electrical output signal if the pressure should rise as would occur in response to an arc within the section. Other bus sensors and device sensors could be provided throughout the entire system as desired. Note that sensors 49 to 56 will be provided for each phase of the system of FIG. 1 but are schematically illustrated for only a single phase for purposes of simplicity.

Each of the sensors, as schematically shown in FIG. 2 for the sensors 49, 50 and 51, has an output connected to a suitable high voltage switch operating mechanism schematically illustrated as high speed switch operating mechanism 60. Mechanism 60 is connected to a movable contact rod 61 carried within a housing 62a, secured to outer housing 14 and sealed thereto to prevent leakage of dielectric gas from the housing 14. The sliding contact 61 is electrically connected to the housing, as through the cluster of contact elements 62, and suitable guide means are provided to enable the contact rod 61 to move along its axis, through an opening in the housing 14, and into engagement with a circular cluster of contacts 63 formed in the central conductor 13. Note that the contact cluster 63 will be arranged such that good low resistance contact can be made to contact rod 61 when the contact rod 61 is moved downwardly by the operating rod 60.

The components 60, 61, 62, 62a and 63 can be made as a subassembly which can be connected to the bus in any desired manner, and at any location of the bus, preferably near the input end of the substation. Moreover, the high speed switching device can take any desired form so long as the switch is one which can close in less than one cycle and is capable of closing on a fault current and then reopening when the fault is cleared.

One switching mechanism which can be used for the fault diverter switch is the switching mechanism shown in U.S. Pat. No. 2,971,130, the disclosure of which is incorporated herein by reference, wherein high speed operation is obtained through the use of an electrodynamic type of operating mechanism. Thus, whenever a fault signal is sensed by any one of the sensors 49 to 56, the electrodynamic operating mechanism is tripped in order immediately to ground the conductor 13 to the housing 14, thereby diverting the fault at the input end of the substation and short-circuiting the arc within the substation.

When using the switch of the above-noted patent, it will be obvious to one skilled in the art that the contact configuration shown in the patent can be modified to the contact rod shape for the movable contact 61 and that the stationary contact can be modified to define the contact 63 of FIG. 2. This switch will then be capable of closing within less than one cycle of the time a fault signal is sensed, and the device closes so fast that it can close on the circuit without significant closing arcing, and can carry the system current until back-up circuit protection devices are opened. Moreover, the device is then capable of reopening after the fault has been cleared.

Although a preferred embodiment of this invention has been described, many variations and modifications will now be apparent to those skilled in the art, and it is therefore preferred that the instant invention be limited not by the specific disclosure herein but only by the appended claims.

The embodiments of the invention in which an exclusive privilege or property is claimed are defined as follows:

1. In a high a-c voltage, high-power gas-insulated substation, a plurality of gas-insulated electrical components each having a gas-filled outer conductive housing connected to ground potential; a plurality of gas-insulated bus members interconnecting each of said gas-insulated electrical components; each of said plurality of gas-insulated bus members comprising a central high-voltage conductor, an outer elongated grounded housing filled with a dielectric gas, and spaced insulation supports for supporting said central conductor within said outer housing; a high speed diverter switch connected to at least one of said plurality of gas-insulated bus members for connecting said central conductor to said outer grounded housing in less than one cycle of said outer grounded having the capability of closing on a fault current and reopening when said fault current is cleared; a high speed operating mechanism for operating said diverter switch in response to an operating signal; and fault signal detector means connected in at least given ones of said plurality of bus members for detecting an arc from said central conductor to said grounded housing within said given bus members and providing an output signal; said fault signal detector means connected to said operating mechanism; said output signals from each of said fault signal detector means comprising said operating signal for said operating mechanism, whereby said high speed diverter switch closes to short said central conductor to ground within less than about one cycle in response to the detection of arcing within said substation; each of said fault signal detector means being responsive to pressure increase within their respective bus members.

2. The gas-insulated substation of claim 1 wherein said dielectric gas at least includes sulfur hexafluoride as a component thereof at greater than atmospheric pressure.

3. The gas-insulated substation of claim 1 which further includes an air entrance bushing connected to said gas-insulated substation to connect overhead air-insulated power conductors to said substation; said high speed diverter switch being connected to a gas-insulated bus member which is located close to said air entrance bushing.

4. In a high a-c voltage, high-power gas-insulated substation, a plurality of gas-insulated electrical components each having a gas-filled outer condutive housing connected to ground potential; a plurality of gas-insulated bus members interconnecting each of said gas-insulated electrical components; each of said plurality of gas-insulated bus members comprising a central high-voltage conductor, an outer elongated grounded housing filled with a dielectric gas, and spaced insulation supports for supporting said central conductor within said outer housing; a high speed diverter switch connected to one of said plurality of gas-insulated bus members for connecting said central conductor to said outer grounded housing in less than one cycle of said a-c voltage and having the capability of closing on a fault current and reopening when said fault current is cleared; a high speed operating mechanism for operating said diverter switch in response to an operating signal; and fault signal detector means connected to at least one of said bus members other than said one of said bus members to which said high speed diverter switch is connected for monitoring the current in said bus members and for delivering an output signal in response to the measurement of a fault represented by an arc from any of said central conductors to any of said grounded housings within said bus members; said fault signal detector means connected to said operating mechanism; said output signal from said fault signal detector means comprising said operating signal for said operating mechanism, whereby said high speed diverter switch closes to short said central conductor to ground within less than about one cycle in response to the detection of arcing within said substation.

5. The gas-insulated substation of claim 4 wherein said dielectric gas at least includes sulfur hexafluoride as a component thereof at greater than atmospheric pressure.

6. The gas-insulated substation of claim 4 which further includes an air entrance bushing connected to said gas-insulated substation to connect overhead air-insulated power conductors to said substation; said high speed diverter switch being connected to a gas-insulated bus member which is located close to said air entrance bushing.

7. The gas-insulated substation of claim 4 wherein each of said fault signal detector means are responsive to pressure increase within their respective bus members.

* * * * *

UNITED STATES PATENT AND TRADEMARK OFFICE
CERTIFICATE OF CORRECTION

PATENT NO. : 4,130,850
DATED : 19 December 1978
INVENTOR(S) : John C. Cronin and Willy Schuetz It is certified that error appears in the above-identified patent and that said Letters Patent are hereby corrected as shown below:

Column 5, line 1 - delete "outer grounded" and replace by
--a-c voltage and--

Signed and Sealed this

Eighth Day of January 1980

[SEAL]

Attest:

SIDNEY A. DIAMOND

Attesting Officer

Commissioner of Patents and Trademarks